Figure 1:
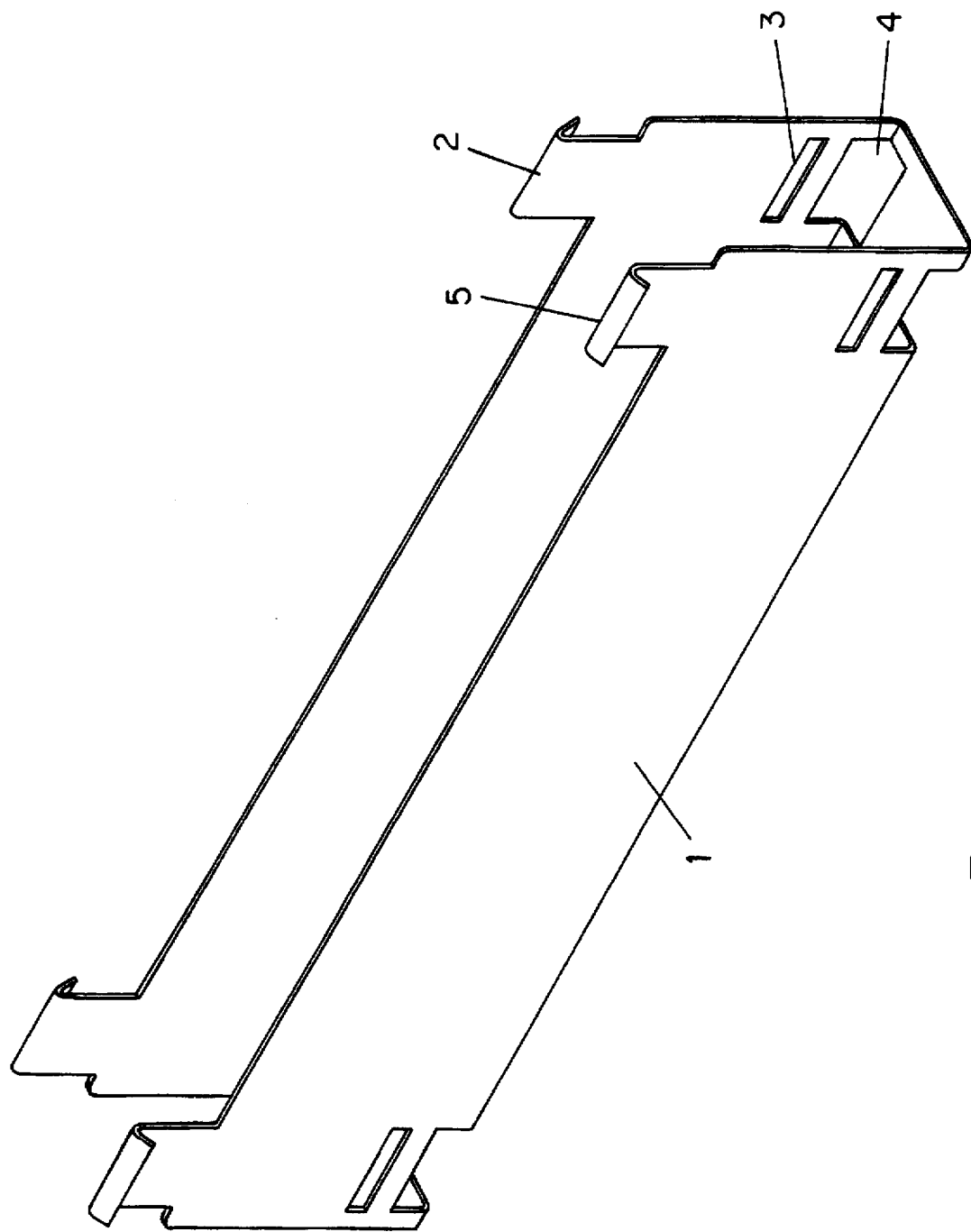

United States Patent [19]

Hui

[11] Patent Number: 5,663,527

[45] Date of Patent: Sep. 2, 1997

[54] STACKABLE CONDUITS WITH HOOK AND HOLE CLIP MEANS

[75] Inventor: Lau Kai Hui, Selangor, Malaysia

[73] Assignee: Artwright Technology SDN BHD, Kuala Lumpur, Malaysia

[21] Appl. No.: 544,573

[22] Filed: Oct. 18, 1995

[30] Foreign Application Priority Data

Oct. 18, 1994 [MY] Malaysia .................. UI 9402781

[51] Int. Cl.⁶ .................................................. H02G 3/04
[52] U.S. Cl. ...................... 174/68.3; 174/15; 174/151
[58] Field of Search ........................... 174/101, 68.3, 174/68.1, 95; 248/224.8, 225.21; 292/80, 121

[56] References Cited

U.S. PATENT DOCUMENTS

| | | | |
|---|---|---|---|
| 529,945 | 11/1894 | Orb | 292/307 R |
| 2,072,257 | 3/1937 | Greve | 292/91 |
| 3,909,505 | 9/1975 | Taylor | 174/72 A |
| 4,498,653 | 2/1985 | Quest | 248/224.8 |
| 4,627,469 | 12/1986 | Buard | 138/92 |
| 4,951,716 | 8/1990 | Tsunoda et al. | 138/162 |
| 4,990,722 | 2/1991 | Navazo | 174/97 |

FOREIGN PATENT DOCUMENTS

| | | | |
|---|---|---|---|
| 0374639 | 6/1990 | European Pat. Off. | |
| 443432 | 2/1968 | Switzerland | 174/101 |

Primary Examiner—Kristine L. Kincaid
Assistant Examiner—Kamand Cuneo
Attorney, Agent, or Firm—Lowe, Price, LeBlanc & Becker

[57] ABSTRACT

This utility innovation relates to a clip in electrical conduit units that enables quick, fast and efficient method of fixing conduits units one below another in series. The conduits so formed one below the other effectively and neatly manage the separation of sensitive electric cables such as audio, video and telephone cables from other electrical power cables. The conduit unit is characterized by a conduit body (1) having integrally formed male end clips (2), each with a lip (5) and slots (3) and openings (4) to receive the male end clips of an adjacent conduit body.

4 Claims, 4 Drawing Sheets

STACKABLE CONDUITS WITH HOOK AND HOLE CLIP MEANS

FIELD OF UTILITY INNOVATION

This utility innovation relates to a clip means in electrical conduit units that enables quick, fast and efficient method of fixing conduits units one below another in series. The conduits so formed one below the other effectively and neatly manage the separation of sensitive electric cables such as audio, video and telephone cables from other electrical power cables.

OBJECTS OF THE UTILITY INNOVATION

Presently, the practice in the electrical trade is that electrical cables are housed in conduits and where there is a need to separate and maintain the electrical cables, distinct and separate conduits are used to avoid the undesired mix of cables. However, the use of separate conduits gives rise to difficulty in maintaining neatness in the management of the conduits particularly situations where there is not much space as inside a partition.

It is an object of the utility innovation to provide an electrical cable management system that uses interlocking conduit units.

It is also an object of the invention that the interlocking conduits may be secured to one another to by integrally formed clip means.

DESCRIPTION OF THE UTILITY INNOVATION

In order that the utility innovation may be easily understood reference will now be made to the accompanying drawings as follows:

FIG. 1. illustrates a conduit unit

Figure 2:
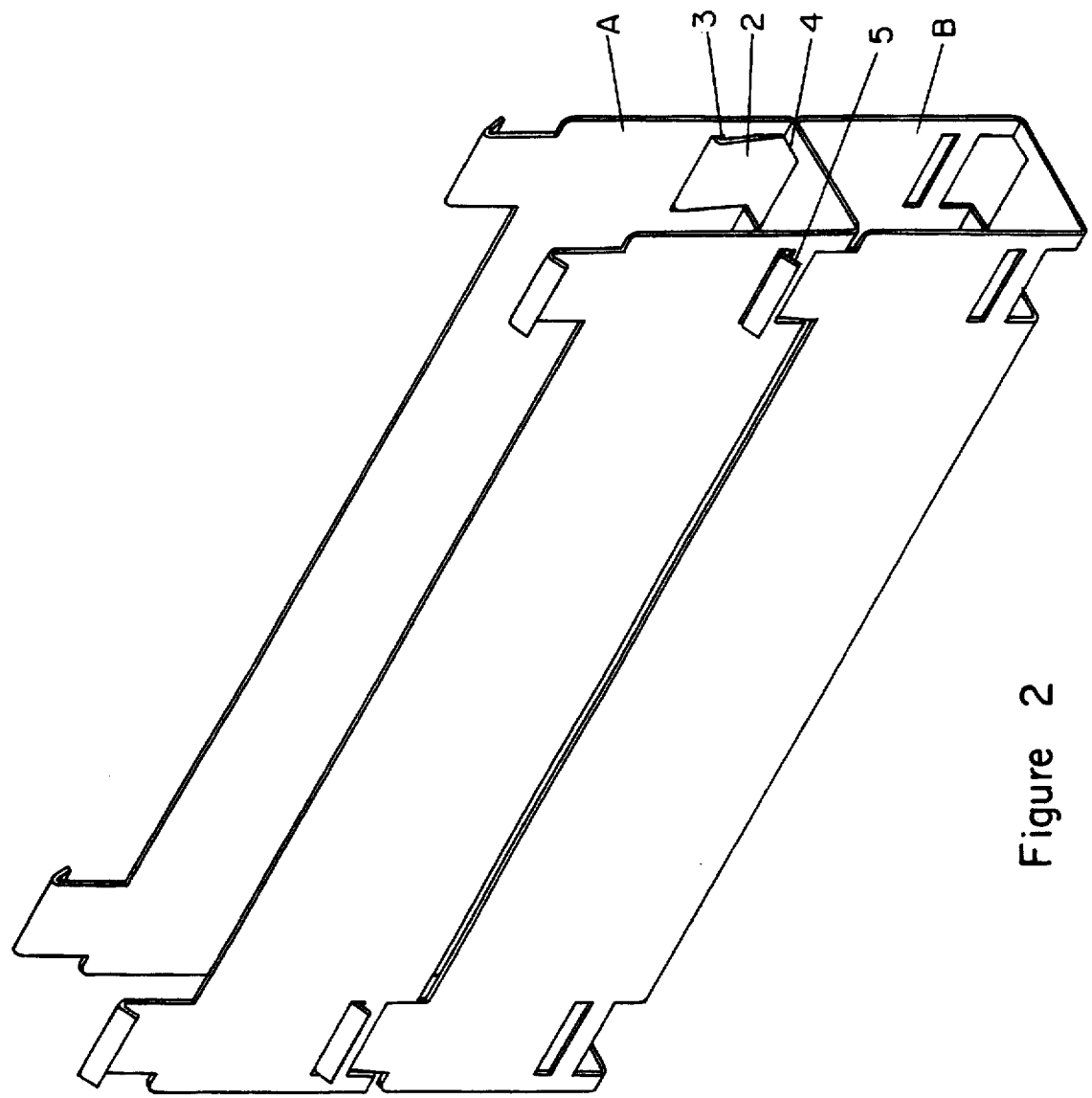

FIG. 2. illustrates a conduit unit that is attached to another conduit unit

Figure 3:
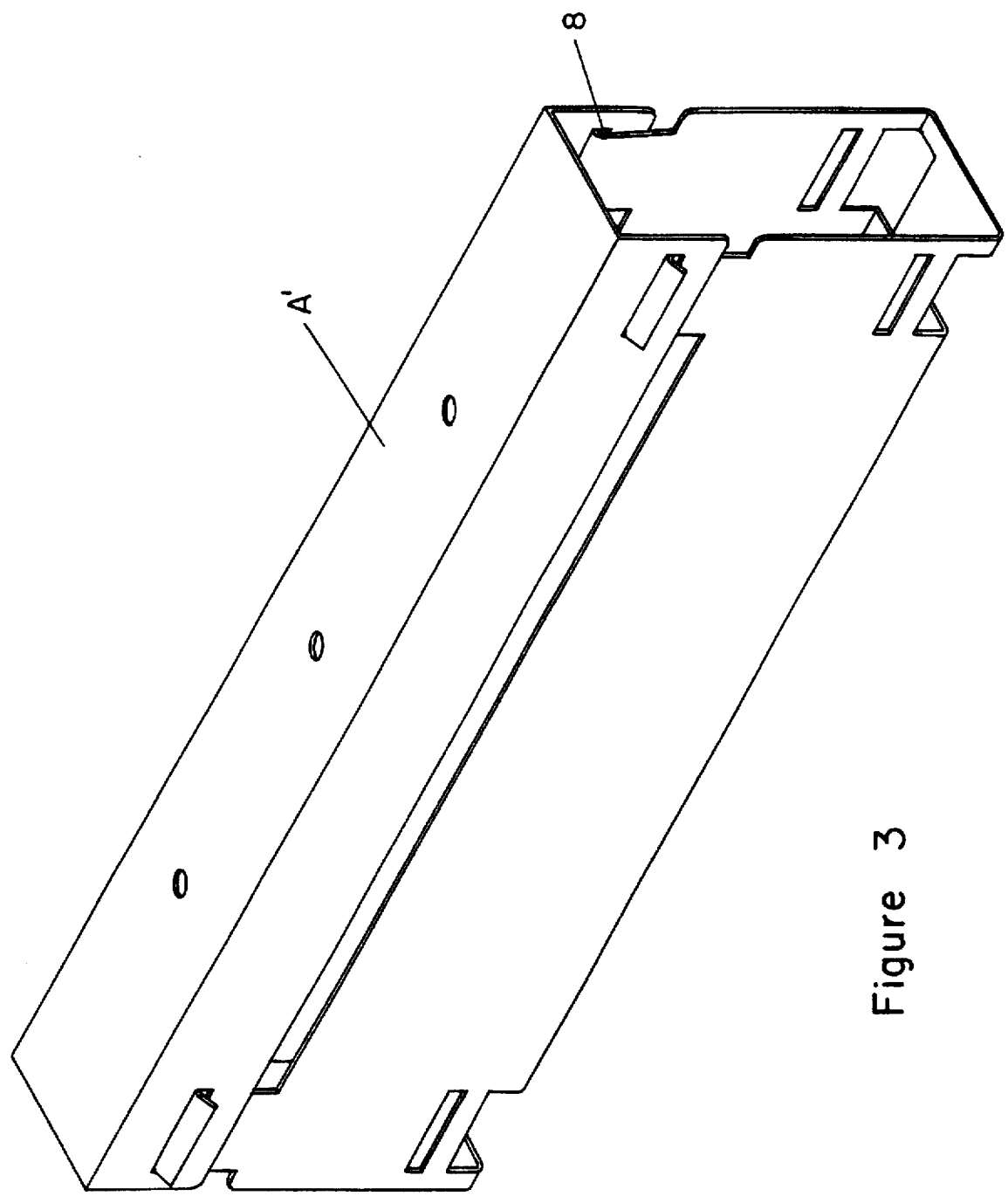

FIG. 3. illustrates a conduit unit that is attached to a cover hanger plate A'.

Figure 4:
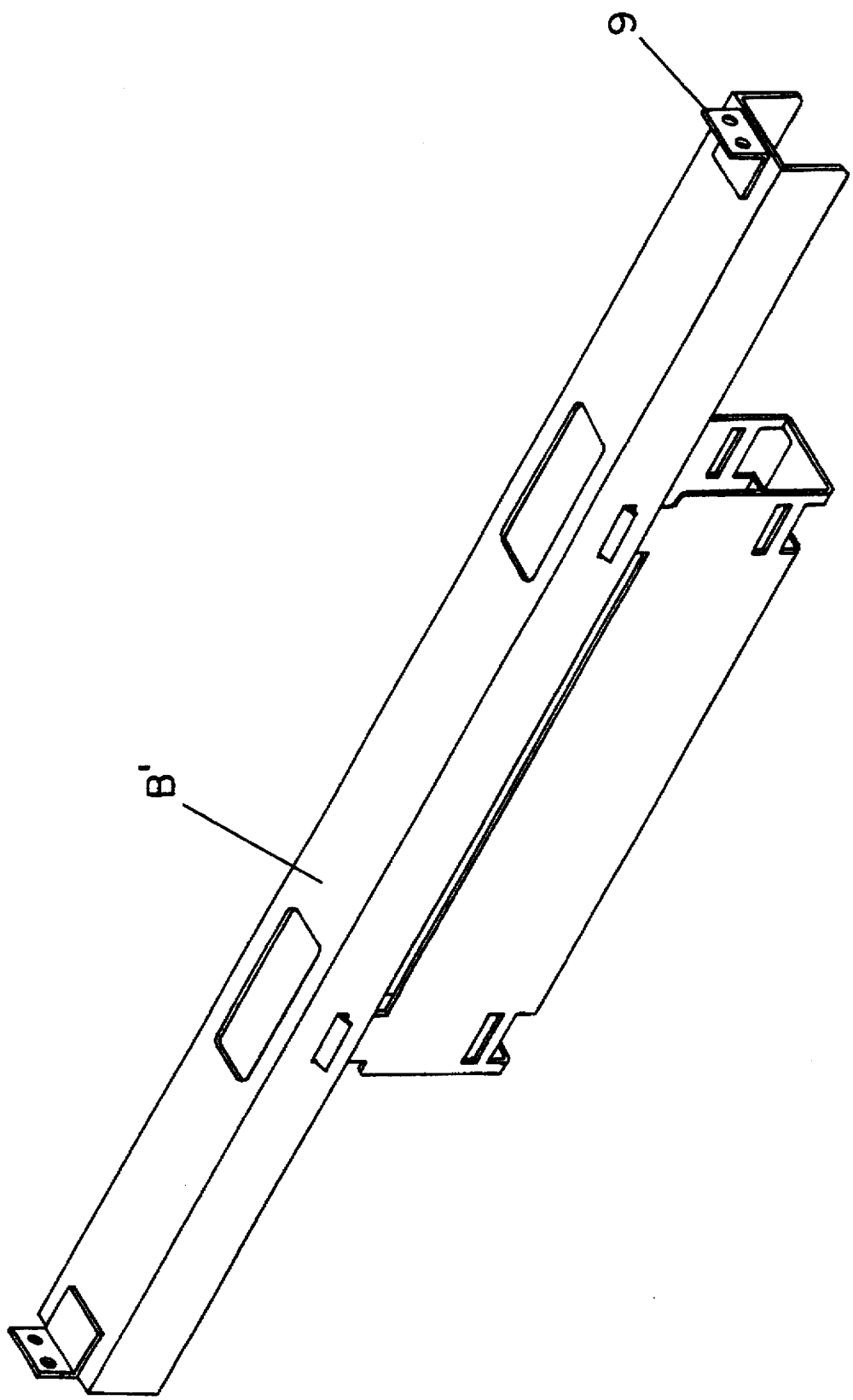

FIG. 4. illustrates a conduit unit that is attached to a cover hanger plate B'.

Referring to FIG. 1, in this embodiment the 'U' shaped body of the conduit is shown as (1). Without loosing the generality of the cross-sectional shape of the body of the conduit, it is equally possible to configure cross-sectional appearance of the body of the conduit having semi circular or other workable cross-section.

The male end of the clip means is shown as (2). Each conduit unit is configured to have at least four such male end of the clip means. Each male end of the clip means is integrally formed part of the conduit unit and are generally positioned at the ends of the conduit unit as shown in FIG. 1.

Each end of the male end of clip means is turned to form a lip (5) at an acute angle. The male end of clip means (2) has sufficient resilience inherent in the material used.

Directly below and in line with the male end of clip means a rectangular shaped slot is formed shown as (3) and is referred to as the female end of the clip means. The dimension of the slot is marginally larger to receive the lip (5) of the male end of clip means (2). Thus there are equal number of slots positioned below the male end of clip means for each conduit unit.

Directly below the slot means (3) is the opening (4) made in the body of conduit unit as shown in FIG. 1. The opening (4) is generally made larger in dimension; than the slot (3).

Thus there are equal number of opening (4) positioned below the female slot (3) for each conduit unit.

The following is a description of how the clip means of the conduit unit works to form separated conduit in series one below the other.

Referring to FIG. 2, from the bottom of the conduit unit (A), the male ends of the clip means (2) of the conduit unit (B) are passed through the openings (4).

The lip (5) of each of the male ends of the clip means of conduit unit (B) resciliently "give" before each of the lip (5) engages in the slots (3). The lip (5) formed at an acute angle enables to hook the conduit unit (B) to the slot (3) of conduit unit (A). Thus the male and female ends of the clips means act together as hooks.

This arrangement of clip means as explained, it is easy to appreciate that conduit units may be hooked one below the other in series with each conduit unit forming a separated conduit.

Referring to FIG. 3 in order to secure the top most conduit in a series of conduits, what is referred to as a, cover hanger A' plate is secured to a fixture such as a partition for example, by screw means preferably.

The cover hanger plate has at least 4 slots (8) which have the same dimension as the female slot (3).

To secure the conduit unit to the cover hanger plate, as explained above, the male end of the clip means of the conduit unit are made to hook on the slots (8) of the cover plate.

FIG. 4 shows an alternative embodiment of the cover hanger plate A' shown in FIG. 3 which is designated as cover hanger plate B'. In cover hanger plate B', slots 8' are provided for attachment to a conduit unit and apertured flanges 9 are provided to secure the cover hanger plate B' to a fixture.

I claim:

1. An electrical conduit unit including an elongate conduit body having side walls interconnected by a base, each of said side walls having at least two male clips and at least two female throughhole arrangements, each of said male clips aligned with a respective one of said female throughhole arrangements so that each of said male clips of one said conduit unit can engage a respective one of said female throughhole arrangements of another said conduit unit for hanging said one said conduit unit to said another said conduit unit to thereby locate said one and another said conduit units in vertically adjacent, substantially parallel positions, wherein said each of said male clips includes a tab extending from a respective one of said sidewalls of the elongate conduit body, said tab having a peripheral end portion thereof, and wherein each of said female throughhole arrangements includes a first opening located in a respective one of said sidewalls of the elongate conduit body and a second opening in a portion of the base and said respective one of said sidewalls, the tab sliding through the second opening and the peripheral end portion being locatable in said first opening when said one and another said conduit units are in adjacent, substantially parallel positions.

2. An electrical conduit unit according to claim 1 wherein said peripheral end portion of the tab includes a lip for engaging the first opening.

3. An electrical conduit assembly including at least one conduit unit according to claim 1 further including a cover hanger plate securable to a fixture, wherein said each of said male clips of the conduit unit is engagable with a cooperating through opening provided in said cover hanger plate, to thereby allow the conduit unit to be suspended from the cover hanger plate.

4. An electrical conduit assembly according to claim 3 further comprising a plurality of said conduit units, one of said conduit units attached to the cover hanger plate, the remainder of said plurality attached to said one of said conduit units in sequential and vertical order.

* * * * *